No. 809,986. PATENTED JAN. 16, 1906.
G. H. F. SCHRADER.
TIRE AND OTHER VALVES.
APPLICATION FILED FEB. 6, 1897.
FIG. 2.  FIG. 1.  FIG. 3.
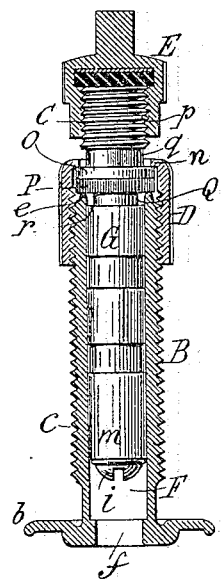 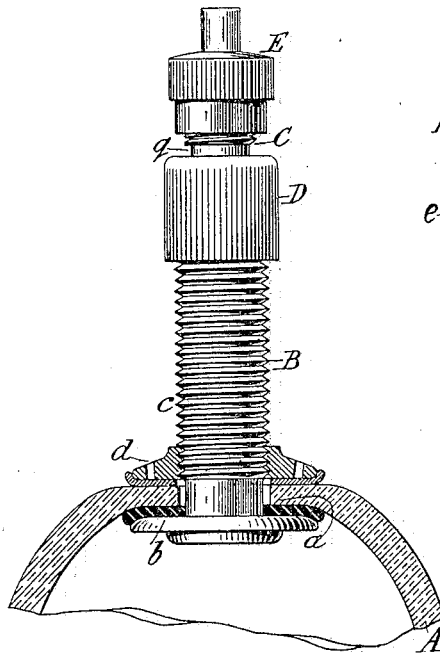 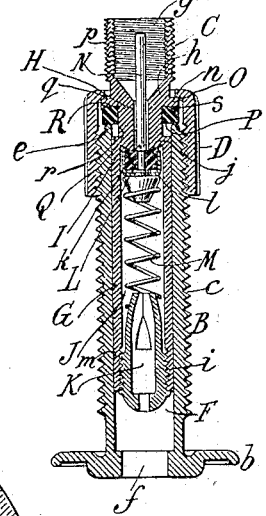
FIG. 4.
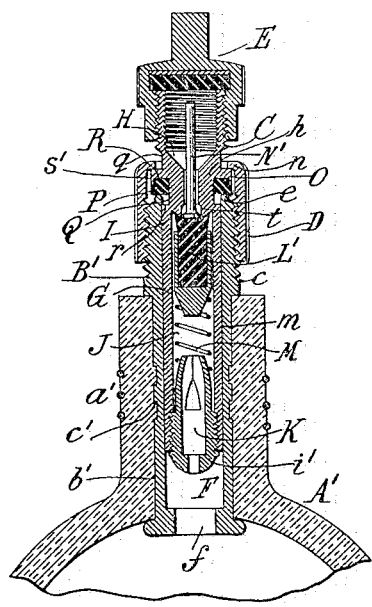
WITNESSES:
Fred White
Thomas F. Wallace
INVENTOR:
George H. F. Schrader,
By his Attorneys,

UNITED STATES PATENT OFFICE.

GEORGE H. F. SCHRADER, OF NEW YORK, N. Y., ASSIGNOR TO A. SCHRADER'S SON, INCORPORATED, OF NEW YORK, N. Y., A CORPORATION OF NEW YORK.

TIRE AND OTHER VALVES.

No. 809,986.     Specification of Letters Patent.     Patented Jan. 16, 1906.

Application filed February 6, 1897. Serial No. 622,297.

*To all whom it may concern:*

Be it known that I, GEORGE H. F. SCHRADER, a citizen of the United States, residing in the city, county, and State of New York, have invented certain new and useful Improvements in Tire and other Valves, of which the following is a specification.

This invention relates to valves of the class employed for pneumatic tires, and aims to provide certain improvements therein which will be hereinafter fully set forth.

Tire-valves are generally of one of two classes, either the usual "cot-valve," in which a metal tube for carrying the valve and constituting part of the shell thereof is inserted into a rubber cot projecting from the tire and clamped therein by a winding of wire around the cot, or the "shoe-valve," in which a like tube has an end flange which passes into the tire itself, an outer nut screwing on the metal tube to clamp the tire between the nut and flange. With such constructions the metal tube is known as the "tire-tube" and constitutes one member of the valve-shell to which the other member may be swiveled, so that the valve proper may play between the two members. In my present invention I provide improvements whereby the metal tire-tube is made a mere carrier for the valve-shell and valve proper, a complete valve being coupled to this tube in such manner that by one operation it can be entirely removed.

The invention is applicable to either a "shoe-tube" or a "cot-tube."

In the accompanying drawings, Figure 1 is a side elevation of a tire-tube fastened to a tire and provided with my improved valve, the tube being of the shoe variety and the tire being shown in section fragmentarily. Fig. 2 is an axial section of the tire-tube removed, showing my improved valve in side elevation therein. Fig. 3 is a similar view showing the valve in axial section; and Fig. 4 is an axial section of a cot-tube and my improved valve therein, showing the tire-cot fragmentarily and showing a slight modification of the valve.

Referring to the drawings, let A indicate a tire; B, the metal tire-tube; C, the valve; D, the coupling between the latter and the tube B, and E its cap.

The tire shown in Fig. 1 is the ordinary single-tube tire, through the hole $a$ of which the shoe-flange $b$ of the tube B is passed. The tube is externally screw-threaded, having a thread $c$, on which a nut $d$ screws to clamp the tire between itself and the shoe $b$ for fixing the tube B to the tire. According to the preferred form of my improvements, as shown in Figs. 1, 2, and 3, the tube B is constructed with a smooth and preferably cylindrical internal socket F, extending from its outer end $e$ inwardly a suitable distance and communicating with the tire through a hole $f$ at its inner end, and the valve C consists in itself of a complete valve-shell inclosing a valve-chamber, seat, and valve proper and having ingress and egress ducts at opposite sides of the latter, which shell is removably coupled to the tire-tube B with an air-tight joint and fits the socket F thereof. The valve C is shown as consisting of a tubular shell member G, having an ingress-duct H, a seat I, and a valve-chamber J and egress-duct K, affording communication through it. The duct H at its outer end consists of an enlarged screw-threaded socket $g$ for coupling a pump or cap to the shell. Between this point and the seat the duct is a small hole passing through a contracted neck $h$. The seat extends from the duct outwardly and is shown as upwardly beveled to the walls of the chamber J, which chamber is of suitable size and shape to receive the valve proper, L. At its inner end the chamber J is partly closed or contracted in any suitable way, as by having the tubular screw-threaded plug $i$ screwed into it.

The shell G carries the valve proper, L, in its chamber J, and carries a spring M between the valve proper and the plug $i$, when such spring is desired for holding the valve toward the seat. The valve proper may be of any suitable construction, that shown in Fig. 3 being a freely-movable valve having a rigid stem N, surrounded by a rubber ring $j$, which fits under a shoulder $k$ on the stem and is held thereon by a flange-cup $l$, the outer end of the stem being cylindrical and of larger diameter than the part thereof within the ring $j$ and projecting into the socket $g$, so that it can be acted on to manipulate the valve—as, for example, to open it, which is done by pressing in the stem. This is a common construction of valve proper heretofore produced by me, and any other known or suitable construction may be substituted for it. Externally the shell G has a long and preferably smooth and cylindrical inner end having a wall m, fitting the socket F throughout a considerable portion thereof, or at successive points thereof, as near its outer and inner ends, so that when the shell is in the tire-tube it is suitably held by this fit. Near its outer end the shell has an external shoulder or flange O, which is engaged by the inturned flange n of an externally-roughed and internally-screw-threaded union D, which screws over the end e of the tube B, and thereby couples the shell thereto. Beyond the flange O the shell G has an externally-screw-threaded end p of greater diameter than the inner diameter of the flange n for receiving the cap E or for a pump-coupling, and between this thread and the flange O the shell may be constructed with a reduced groove q for affording free play for the union D and providing a slight shoulder for preventing or resisting accidental falling of the union from the shell when the two are unfastened from the tube B.

To make a leak-tight joint between the tire-tube B and the valve C, any suitable means may be provided; but I prefer to provide an annular packing-ring P, which surrounds the shell G beyond the end of the tube B and is clamped between this end and the flange O by the union D. I preferably form an annular recess Q in the outer wall m of the shell for receiving the ring P, leaving a shoulder r at the bottom of this recess for preventing accidental escape of the ring. I preferably also provide an annular recess R in the under side of the flange O for partly receiving this ring, the edge of the flange constituting a slight lip or flange s for embracing the outer edge of the ring and preventing its undue lateral expansion. The recess Q is longer than the width of the ring when compressed, so that when the union is screwed home the ring is forced tightly into the recess R and a leak-tight joint is made between the tube B and the flange O, the ring being preserved against undue injury by the recesses. In the construction shown the recesses are both outwardly of the seat I and opposite the neck h of the shell. The shell G is of such length that it is entirely free or unsupported at its lower end, the latter being arranged a sufficient distance above the bottom of the tire-tube B to permit considerable variation in the thickness and degree of compression of the packing-ring P. The contact of the packing-ring with the edge of the tire-tube therefore alone limits the longitudinal movement of the valve in the tire-tube, and the latter is free to permit the tightening of the joint along this line to any desired degree, thus insuring a perfectly leak-tight joint.

In use my invention permits of the metal tube B being permanently attached to the tire, so that it can be applied before the latter is vulcanized and need never be removed therefrom. The valve C can then at any time be applied to the tube B or removed therefrom by any person. Its packing-washer P can be renewed whenever necessary by simply uncoupling the valve member and substituting a new for the old washer. The internal mechanism of the valve C can be renewed or repaired by separating the valve member and then freeing its internal parts. There is no necessity for tampering with the connection between the tire and the tire-tube B in order to make any correction in the valve. The fit between the tire-tube and the shell G insures proper holding of the shell and protection of the latter against injury, so that its inclosed end which must have the relatively large valve-chamber can be made very thin to bring the whole device within the small dimensions required for tire-valves.

It will be seen that my invention provides improvements which can be readily and advantageously availed of, and it will be understood that the invention is not limited to the particular details of construction and arrangement set forth as constituting its preferred form, but that it can be availed of according to such modifications as circumstances or the judgment of those skilled in the art may dictate without departing from the spirit of the invention.

In the modification shown in Fig. 4 the tire has a cot A' and the metal tube B' has the reduced end b', having annular roughened ribs or rows c', fitting within the cot and clamped therein by wire a'. Beyond the cot the tube B' has a screw-thread c and outer end e, and internally it has a cylindrical socket F, as before described. The valve C is substantially identical to that shown in the other figures and bears the same letters of reference for its several parts, with the exception of those for the valve proper, which here consists of a stemless valve proper, L', and an independent deflating stem N', which has an enlarged head irremovably holding it in a socket t, adjacent to the seat I. This construction of valve and deflater is one heretofore produced by me. In this construction the flange s' is somewhat deeper than the flange or lip s in the construction before described, so that the socket R more completely receives the packing-ring P. The tubes B and B' are well-known equivalents, as are the valves proper, L and L', and either or any suitable substitute may be employed so far as my invention is concerned.

What I claim is—

1. In tire and other valves, a valve member comprising a complete valve, consisting of a shell having an ingress-duct leading through its outer end, a seat, a valve-chamber, a valve proper in said chamber closing against said seat and an egress-duct, inclosed in its interior, said shell having a smooth outer wall surrounding said chamber and fitting within the interior of a tire-tube, having a projecting flange outwardly of said wall, and a packing-recess R formed in the cylindrical wall of said shell inwardly of said flange, a ring of packing material surrounding said shell and fitting said recess and held against accidental escape by the lower side of said recess, and a union surrounding said flange for removably coupling said member to a tire-tube, and a valve proper within said chamber.

2. In tire and other valves, a valve member having an ingress-duct, a valve-seat, and a valve-chamber, within its interior, and a valve proper in said chamber, said member having an outer cylindrical wall surrounding said chamber, for fitting within the socket of a tire-tube, and having a projecting flange beyond said wall, for projecting across the end of such tube, said member having an annular recess R cut in the cylindrical surface of said shell inwardly of said flange and having a groove in said flange, and a packing-ring in said groove and recess held against accidental escape by the lower side of said recess and prevented from undue lateral expansion by the outer side of said groove, and a coupling surrounding said flange for separately coupling said member to such tube.

3. In tire and other valves, the combination with a metal tube adapted to be fixed to a tire, having a screw-thread and a long, smooth cylindrical socket having an aperture communicating between the socket and its tire end, of a valve member constituting a complete valve, having a shell having an ingress-duct, a valve-seat surrounding said duct, a valve-chamber, and an egress-duct, and having an external long, smooth wall below said seat fitting the socket in said tube with a sliding fit and inclosed throughout its major portion therein, said valve member having a flange projecting over the edge of said tire-tube, and having an annular recess in said shell and a groove on the under side of said flange, and a packing-ring in said groove and recess, a valve proper inclosed within said shell, and means separably coupling said valve member within the socket of said tube, whereby the valve proper is protected within said shell, and the shell is protected within said tube, said shell being of such a length relatively to the clear socket in said tube that it is entirely free or unsupported at its lower end to insure a leak-tight joint at said packing-ring.

In witness whereof I have hereunto signed my name in the presence of two subscribing witnesses.

GEORGE H. F. SCHRADER.

Witnesses:
   GEORGE H. FRASER,
   THOMAS F. WALLACE.